United States Patent [19]

Taylor et al.

[11] 4,316,921
[45] Feb. 23, 1982

[54] HIGH TEMPERATURE LUBRICATING PROCESS

[75] Inventors: Robert W. Taylor; Thomas E. Shell, both of Livermore, Calif.

[73] Assignee: The United States of America as represented by the United States Department of Energy, Washington, D.C.

[21] Appl. No.: 81,987

[22] Filed: Oct. 4, 1979

[51] Int. Cl.³ .............................................. C23C 11/00
[52] U.S. Cl. ................................. 427/249; 60/39.08; 184/1 E; 308/DIG. 9; 308/241; 427/255.2; 427/255.3
[58] Field of Search .............. 184/1 E, 6.11; 427/249; 252/15; 308/240, 241, DIG. 9; 60/39.08

[56] References Cited

U.S. PATENT DOCUMENTS

| | | | |
|---|---|---|---|
| 2,392,682 | 1/1946 | Marek | 427/249 X |
| 2,841,244 | 7/1958 | Sorem | 252/15 X |
| 2,971,609 | 2/1961 | Sorem et al. | 184/1 E |
| 2,994,408 | 8/1961 | Sorem et al. | 184/1 E |
| 3,072,574 | 1/1963 | Buckley et al. | 252/15 X |
| 3,423,929 | 1/1969 | Matthews | 60/39.08 |
| 3,428,519 | 2/1969 | Zvanut | 427/249 X |
| 3,485,657 | 12/1969 | Beaudry et al. | 427/249 X |
| 3,500,525 | 3/1970 | Glenn | 308/241 X |
| 3,711,171 | 1/1973 | Orkin et al. | 308/241 |

OTHER PUBLICATIONS

Taylor et al., "Ash Fouling and Erosion of Silicon-Based Ceramic Expanders in Coal-Fired Power Plants", Jan. 26, 1978.

*Primary Examiner*—David H. Brown
*Attorney, Agent, or Firm*—William S. Bernheim; Roger S. Gaither; Richard G. Besha

[57] ABSTRACT

It has been difficult to provide adaquate lubrication for load bearing, engine components when such engines are operating in excess of about 475° C. The present invention is a process for providing a solid lubricant on a load bearing, solid surface (14), such as in an engine (10) being operated at temperatures in excess of about 475° C. The process comprises contacting and maintaining steps. A gas phase (42) is provided which includes at least one component reactable in a temperature dependent reaction to form a solid lubricant. The gas phase is contacted with the load bearing surface. The load bearing surface is maintained at a temperature which causes reaction of the gas phase component and the formation of the solid lubricant. The solid lubricant is formed directly on the load bearing surface. The method is particularly suitable for use with ceramic engines.

46 Claims, 2 Drawing Figures ically suitable as materials for bearing surfaces within very high-temperature engines. However, a hindrance to high temperature engine operations, for example operations in excess of about 475° C., has involved lubrication of load bearing surfaces.

HIGH TEMPERATURE LUBRICATING PROCESS

BACKGROUND OF THE INVENTION

The United States Government has rights in this invention persuant to contract W-7405-ENG-48 between the United States Department of Energy and the University of California.

This invention relates to a process for lubricating solid surfaces, particularly to lubricating load bearing surfaces, such as the load bearing components in engines being operated at temperatures in excess of about 475° C.

BACKGROUND OF THE INVENTION

To improve efficiency, methods are being sought for adapting heat engines, such as for example automobile engines, gas turbines and the like, to run at temperatures higher than now used. Ceramics are believed to be particularly suitable as materials for bearing surfaces within very high-temperature engines. However, a hindrance to high temperature engine operations, for example operations in excess of about 475° C., has involved lubrication of load bearing surfaces.

At lower engine operating temperatures various lubricants and their application are of course known. For example, U.S. Pat. No. 2,841,244 discloses a mixture of vaporized, relatively volatile non-carbon forming hydrocarbon lubricating liquids and air as useful lubricants for aircraft gas turbine engines; operating temperatures of about 315° C. are disclosed. U.S. Pat. No. 2,994,408 discloses another gaseous mixture for lubricating aircraft gas turbine engines subjected to temperatures of about 425° C. U.S. Pat. No. 3,423,929 discloses a lubricating system for components of missiles, rockets and the like, which system includes a high temperature gas having solid graphite and sulfur particles entrained therein.

To date, however, neither the above nor other prior art lubricating systems have been found satisfactory for use with load bearing surfaces in engines operating at, or exposed to, temperatures in excess of about 475° C., for extended periods or have proved not to be satisfactory for long term operation.

SUMMARY OF THE INVENTION

An object of the present invention is to provide a process in which a very pure, solid lubricant is deposited directly on a load bearing surface.

It is another object of the present invention that such deposited lubricant be suitable for lubricating a load bearing surface when said load bearing surface is at a temperature in excess of about 475° C.

Broadly, this invention is a process for lubricating load bearing surfaces with a solid lubricant. A gas phase is provided which includes at least one component which reacts within a predetermined temperature range to produce a solid reaction product having excellent lubrication properties. The load bearing surface is contacted with the gas phase and is maintained within the predetermined temperature range during the contacting. As a consequence, the lubricating solid reaction product is deposited directly on the load bearing surface.

More particularly, in one aspect of the present invention the gas phase is maintained at a first temperature which is lower than the determinable temperature range wherein the solid reaction product forms, for example lower than about 475° C.; in another aspect, the gas phase is at a second temperature which is higher than the determinable temperature range wherein the solid reaction product forms, for example higher than about 1125° C. In both aspects of the present invention, the solid reaction product which is deposited upon the load bearing surface has lubricant properties and forms a friable, relatively soft film on the load bearing surface.

The advantages of this invention over the prior art are as follows. The gas phase, being homogeneously gaseous until a temperature dependent reaction occurs, yields a very pure solid reaction product. This solid reaction product is substantially without undesirable solid materials such as would otherwise tend to cause wear of load bearing surfaces. Also, the present invention provides that the solid reaction product is deposited directly upon the load bearing surfaces to more efficiently lubricate such surfaces. Direct deposition of the solid lubricant is accomplished because it is the temperature of the load bearing surface which causes the formation of the solid reaction product directly on said surface.

The process of the present invention is particularly suitable to provide a solid reaction product such as carbon, molybdenum disulfide or tungsten disulfide, for load bearing surfaces operating at temperatures in excess of about 475° C. Where, for example, the load bearing surfaces are formed of refractory materials and are components of heat engines, the process of the present invention assists in providing efficient, long lived, very high temperature operations thereof.

DETAILED DESCRIPTION OF THE PREFERRED EMBODIMENTS

Figure 1:
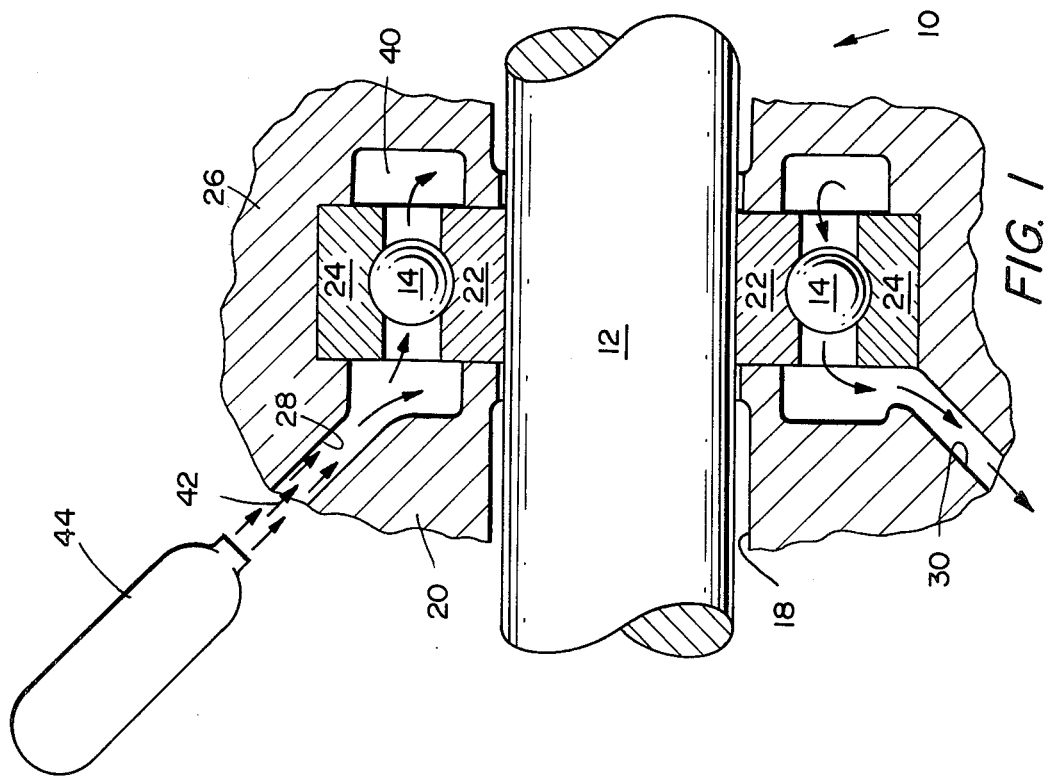
FIG. 1 illustrates a detail of an engine embodiment incorporating a process in accordance with the present invention.

Referring to FIG. 1, the invention will be better understood by reference to a typical embodiment in which it is useful. A radial flow compressor, or turbine, 10 includes a rotatable shaft 12. A plurality of load bearing surfaces are represented by two ball bearings 14 surrounding the shaft 12. Shaft 12 is thus supported concentrically with respect to an opening 18 in a bearing frame, or wall, 20. An annular inner race 22 of the ball bearings 14 is fitted on the shaft 12, and an annular outer race 24 is supported by an annular outer race housing 26. The outer race housing 26 includes a passageway 28 which communicates with the ball bearings 14. Another passageway 30 is spaced from the passageway 28 and also communicates with the ball bearings 14. The passageways 28,30 would, were a conventional lubricating process to be utilized, communicate a liquid lubricant such as oil through the passageway 28 and into a toroidal chamber 40 in which the ball bearings 14 are disposed, and then drain through the passageway 30 to a sump or the like. However in the process of the present invention, said passageways 28,30 are utilized to conduct the gaseous phase to the ball bearings 14, as will be further described hereinafter.

Ball bearings 14 are illustrative of a variety of load bearing surfaces and could be journal bearings and the like. Accordingly, ball bearings 14 will hereinafter be referred to as first surface 14, and the outer race 24 will hereinafter be referred to as second surface 24. Radial flow compressor, or turbine 10, is representative of an engine for operation at very high temperatures. For example, let us assume that shaft 12 is operated at temperatures of from about 900°–1100° C. First surface 14 will then normally be at temperatures of from about 700°–900° C., and second surface 24 will be at temperatures of from about 500°–700° C. This temperature gradient, or decrease, between shaft 12 and second surface 24 is due to heat loss which is typical of normal engine operations.

Because conventional load bearing surfaces, such as first surface 14, are metal and thus become brittle or incur metal fatigue at operating temperatures in excess of about 300° C., the components of very high temperature engines will normally not be of metal but rather be made of refractory materials. Suitable refractory materials are, for example, silicon carbide, silicon nitride, boron carbide and silicon dioxide. The bearing assembly comprising first and second surfaces 14,24 and shaft 12 will normally be made of such refractory materials. It is particularly necessary that the bearing assemblies in a ceramic engine be adequately and suitably lubricated for very high temperature operation. Such lubrication is necessary because ceramic shafts are usually relatively short in length as they tend to become brittle if too elongated. Thus, the bearing assemblies for ceramic shafts are closer to hot compressor vanes or the like, than are bearing assemblies for metal shafts and are subjected to even hotter temperatures than would otherwise be the case. Such bearing assemblies become quite hot due to heat transfer from the shaft and its associated compressor vanes.

Turning now to the invention, the inventive process provides lubrication of hard, load bearing solid surfaces, such as the first and second surfaces 14,24 of compressor 10. The process is suitable for engine operating conditions in excess of 475° C., even more preferably operations at temperatures of from about 525° to about 1125° C.

Referring to FIG. 1, the process provides a gas phase 42 from a source 44 into passageway 28. Gas phase 42 must be homogeneously gaseous when introduced into passageway 28, and gas phase 42 includes at least one component, or gaseous chemical species, which reacts within a predetermined temperature range to produce a solid reaction product. As hereinafter further discussed, the predetermined temperature range has a minimum value of about 475° C. This reaction is hereinafter sometimes referred to as the temperature dependent reaction of gas phase 42.

The particular component or components chosen to be included in gas phase 42 will depend upon the desired solid reaction product. The solid reaction product must have lubricant properties, for example properties as are suitable for reducing friction and wear between first and second surfaces 14,24. Among suitable solid lubricants for very high temperature lubrication are carbon (in graphite form), hereinafter referred to carbon soot, molybdenum disulfide, and tungsten disulfide. The most preferred solid lubricant is carbon soot.

A variety of chemical species are suitable for producing carbon soot in the temperature dependent reaction of gas phase 42. More particularly, fuel rich, carbonaceous gases such as methane, ethane, propane, and/or butane are suitable chemical species. These lower alkane gases will spontaneously decompose to form carbon soot in the temperature dependant reaction of gas phase 42. Carbonaceous gases such as carbon dioxide and carbon monoxide are also suitable chemical species. A preferred chemical species for precipitating carbon soot in the temperature dependent reaction is a gaseous mixture of carbon dioxide and carbon monoxide.

Gas phase 42 is communicated from source 44 through passageway 28 at a first, or initial temperature. This first temperature is either greater than or less than the determinable temperature range. Referring generally to FIG. 1, the source 44 for gas phase 42 may be a variety of structures such as gas canisters or the like, and the origin of gas phase 42 from source 44 may be, for example, by diverting a small gaseous plenum from the exhaust gases of compressor 10. Structurally, source 44 may also include various conventional means such as pumps, metering components and the like. The gas phase 42, as it is pumped into passageway 28, may include various gases which do not participate in the temperature dependent reaction so long as such other gases do not interfere with the temperature dependent reaction yielding the desired solid lubricant.

Figure 2:
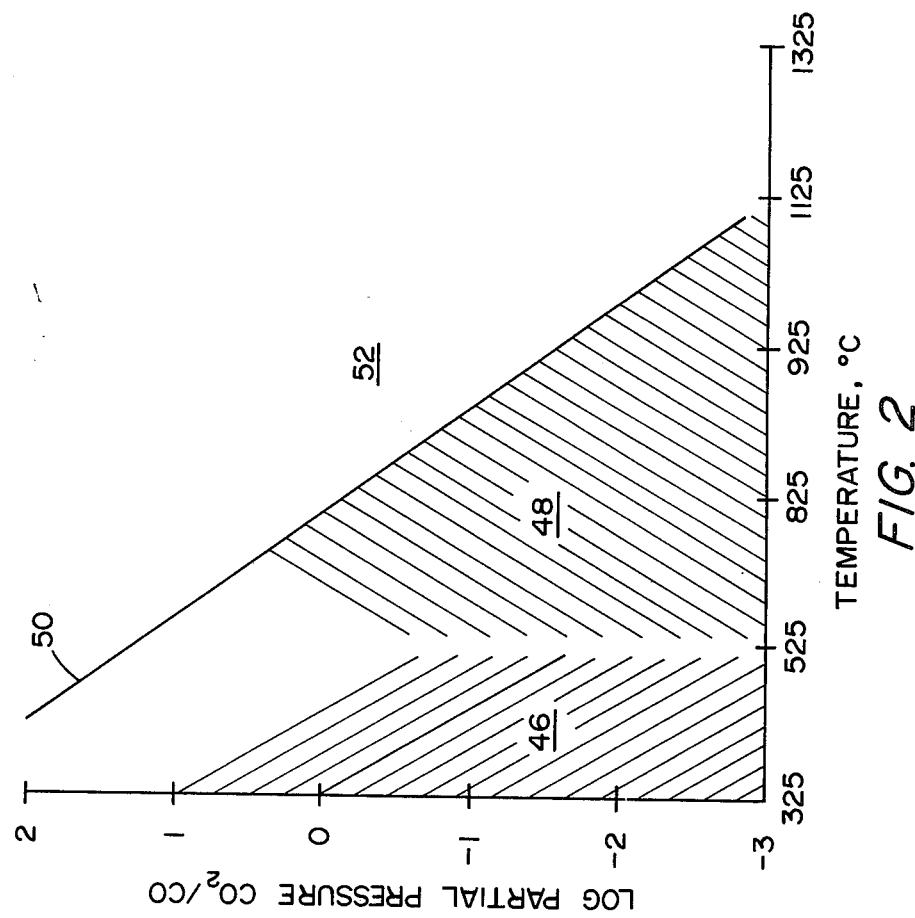
FIG. 2 is an equilibrium phase diagram for carbon dioxide and carbon monoxide mixtures which illustrates aspects of the present invention.

Turning to FIG. 2, let us assume that gas phase 42 is at a first temperature less than about 525° C. FIG. 2 is an equilibrium phase diagram for mixtures of carbon dioxide and carbon monoxide. In a region 46 of FIG. 2, the carbon dioxide and carbon monoxide mixtures will be thermodynamically metastable, but homogeneously gaseous. Region 46 illustrates homogeneously gaseous mixtures of carbon dioxide and carbon monoxide as a function of temperature. As represented by the logarithm of the partial pressure ratios of carbon dioxide with respect to carbon monoxide, plotted along the ordinate in values of from about −3 to about 1, such carbon dioxide and carbon monoxide mixtures will remain gaseous at temperatures below about 525° C.

A situation analogous to that just described will be obtained when gas phase 42 is at a first temperature which is higher than about 1125° C. This analogous situation is illustrated in FIG. 2 as region 52 therein. The temperature dependent reaction will now be more specifically described.

Returning to FIG. 1 and to the assumption that the gas phase 42 has carbon dioxide and carbon monoxide therein and that the first temperature is less than about 525° C., the gas phase 42 contacts first surface 14. First surface 14 is being maintained at a second, or operating temperature, of from about 525° to about 1125° C. When gas phase 42 contacts first surface 14, the carbon dioxide and carbon monoxide components react to produce carbon soot since the gas phase bathes surface 14 and is thereby heated to a solid carbon soot deposition temperature. This is an example of the temperature dependent reaction in practice of process 40, and is represented by equation 1:

$$2CO_{2(g)} + 2CO_{(g)} \rightarrow {}^*C_{(s)} + 3CO_{2(g)} \tag{1}$$

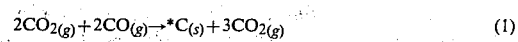

*Temperature 525°–1125° C.

Referring to FIG. 2, a thermodynamically stable region 48 is illustrated wherein the temperature dependent reaction represented by equation 1 is occuring and carbon soot is being formed.

Where the desired solid reaction product is a metallic sulfide such as molybdenum disulfide, then the temperature dependent reaction for molybdenum disulfide will be represented by equations 2 or 3:

$$MoO_{3(g)} + 3S_{(g)} \rightarrow {}^*MoS_{2(s)} 30\ SO_{3(g)} \quad (2)$$

*Temperature 475°–1175° C.

$$MoO_{3(g)} + H_{2(g)} + H_2S_{(g)} \rightarrow {}^*MoS_{2(s)} + 3H_2O_{(g)} \quad (3)$$

*Temperature 475°–1175° C.

Similarly, where tungsten disulfide is the desired solid reaction product, the temperature dependent reaction will be generally represented by equations 4 or 5:

$$WO_{3(g)} + 3S_{(g)} \rightarrow {}^*WS_{2(s)} + SO_{3(g)} \quad (4)$$

*Temperature 475°–1175° C.

$$WO_{3(g)} + H_{2(g)} + H_2S_{(g)} \rightarrow {}^*WS_{2(s)} + 3H_2O_{(g)} \quad (5)$$
*Temperature 475°–1175° C.

Although the primary dependent variable for the temperature dependent reactions of gas phase 42, as illustrated by equations 1–5, is that of temperature, other, less significant variables will tend to affect the precise temperature value at which the formation of solid reaction product is initiated (or ceases), and will tend to affect the formation rate. These other variables, in approximate order of importance, include the particular chemical species and their stoichiometric relationship, the particular material which forms first surface 14, and the particular load conditions of first surface 14. In any event formation of the solid reaction product lubricants in accordance with the present invention will generally be initiated at temperatures in excess of about 525°±50° C. and will cease at temperatures in excess of about 1125° C.±50° C. The precipitation rate of solid reaction product lubricants in practice of process embodiment 40 is generally from about 250 to about 750 miligrams per hour, characteristically about 500 miligrams per hour.

Referring to FIGS. 1 and 2, the inventive process proceeds as the gas phase 42 is continuously pumped into passageway 28 and thus into communication, or contact, with first surface 14. Gas phase 42 is at a temperature less than about 525° C.±50° C. In this example, first surface 14 must be maintained at a temperature of from about 525° C. to about 1125° C. in order to initiate the temperature dependent reaction of the chemical species in gas phase 42 to form the solid lubricant deposit.

The contacting of first surface 14 with a relatively cooler gas phase 42 will cool first surface 14. Were first surface 14 to be cooled below about 525° C.±50°, then the solid reaction product would substantially cease to be formed. Thus, it is important to maintain first surface 14 within the predetermined temperature range for forming the solid reaction product. Normal, high temperature operating conditions of compressor 10 will usually be sufficient to maintain the temperature of first surface 14 within the predetermined temperature range. As previously noted, shaft 12 will normally be at a temperature of about 900°–1100° C. Due to heat transfer, and also due to heat generated by friction between first and second surfaces 14,24, the first surface 14 would thus be at a temperature of about 700°–900° C. prior to contact with relatively cooler gas phase 42. During the contacting, however, the heat transfer from shaft 12 and the friction generated between surfaces 14,24 will be normally sufficient to maintain first surface 14 at a temperature in excess of 525° C., more preferably at a temperature of at least about 600° C. Thus, the solid reaction product lubricant will be continuously formed during the contacting of gas phase 42 with first surface 14, for example as is illustrated by region 48 of FIG. 2.

As will be understood, as the contacting of first surface 14 with relatively cooler gas phase 42 progresses, such contacting then includes contacting first surface 14 while it has a very thin coating of already deposited solid reaction product thereon. Were such coating to become relatively thick, first surface 14 would tend to be insulated, and the temperature dependent reaction might cease. This condition does not, however, normally occur, primarily because frictional engagement of first surface 14 with second surface 24 wears away the coating, or film, of solid reaction product. Such frictional engagement may thus be said to assist in maintaining first surface 14 at the predetermined temperature range so that the solid reaction product deposits directly upon the first surface 14, or directly upon the very thinly coated first surface 14.

Now let us assume that gas phase 42 is at a temperature which exceeds the predetermined temperature range. With reference to FIG. 2, this is illustrated by region 52. This very hot gas phase 42 may be conveniently obtained by tapping small portions of partially combusted fuel adjacent the mouth of a turbine burner inlet above the flame thereof (not herein illustrated). In this example, gas phase 42 is relative hotter than the temperature of first surface 14, as first surface 14 is initially at a temperature within the predetermined temperature range of from about 525° to about 1125° C. Upon contact of gas phase 42 with first surface 14, formation of solid reaction product lubricant will be initiated. Such contacting acts to heat first surface 14. Were first surface 14 to be heated to above about 1125° C.±50°, then the solid reaction product would cease to be formed. Thus it is important to maintain first surface 14 within the predetermined temperature range for forming the solid reaction product. As previously discussed, shaft 12 will normally be at a temperature of about 900°–1100° C., and first surface 14 is at a temperature of about 700° C.–900° C. prior to contact with the gas phase 42. However, the gas phase 42 is now relatively hotter than first surface 14. During gas-surface contact, the heat loss through second surface 24 and housing 26 will be normally sufficient to maintain first surface 14 at a temperature less than 1125° C., more preferably at not greater than about 1000° C. Thus, the formation of solid reaction product lubricant upon first surface 14 is continuously provided, for example as is illustrated by region 48 of FIG. 2.

Whether gas phase 42 is at temperature in excess of about 1125° C. or less than 525° C. during contact between gas and bearing surface, the solid lubricant which is formed deposits directly upon first surface 14. This directly deposited lubricant is in the form of a friable, soft film, and significantly decreases friction between the surfaces 14,24. The relative softness of this friable film is due in large part to the very small size of the solid particles which form the film. Most of these solid particles are less than about 1 micron in size. It has been found that where gas phase 42 has components which react to form carbon soot, and surfaces 14,24 are formed of silicon carbide in rolling engagement with each other, friction therebetween is reduced by a factor of about 50%.

It will be obvious that if the process of the invention is followed as noted above, and if gaseous phase components are provided in accordance with one of equations 2–5 or analogous equations thereto, other lubricant solids such as molybdenum and tungsten sulfide may be deposited on the bearing surfaces.

In summary, utilization of process embodiment 40 in engines results in direct deposition of a solid lubricant upon bearing surfaces thereof. The deposited solid lubricant is in the form of a friable soft film. The deposited solid lubricant is extremely pure and does not contain undesirable solid impurities which might tend to cause wear of load bearing surfaces, since the solid lubricant is a reaction product from homogeneously gaseous chemical species. The process is particularly suitable for providing lubrication in ceramic engines operating at very high temperatures.

Other aspects, objectives, and advantages of this invention can be obtained from a study of the drawings, the disclosure and the appended claims.

We claim:

1. A process for providing substantially without combustion, a solid friction reducing lubricant on a load bearing surface comprising:
   contacting a load bearing surface with a gaseous phase including at least one component which reacts in a predetermined temperature range to produce a solid reaction product, said solid reaction product having lubricant properties; and
   maintaining said load bearing surface within said predetermined temperature range at such times as said load bearing surface is contacted with said gaseous phase so that said solid reaction product deposits directly on said load bearing surface.

2. The method as in claim 1 wherein said predetermined temperature range is within from about 475° C. to about 1125° C.

3. The method as in claim 1 wherein said load bearing surface is maintained at a surface temperature within from about 600° to about 1000° C.

4. The method as in claim 1 wherein said component includes methane.

5. The method as in claim 1 wherein said component includes ethane.

6. The method as in claim 1 wherein said component includes propane.

7. The method as in claim 1 wherein said component includes butane.

8. The method as in claim 1 wherein said component includes carbon dioxide.

9. The method as in claim 1 wherein said component is a plurality of components, said components including carbon dioxide and carbon monoxide.

10. The method as in claim 1 wherein said component includes a metallic oxide.

11. The method as in claim 1 wherein said component is a plurality of components, said components including a molybdenum oxide species and a sulfurous species.

12. The method as in claim 1 wherein said component is a plurality of components, said components including a tungsten oxide species and a sulfurous species.

13. The method as in claim 1 wherein said solid reaction product is a metallic sulfide.

14. The method as in claim 1 wherein said solid reaction product is molybdenum disulfide.

15. The method as in claim 1 wherein said solid reaction product is tungsten disulfide.

16. The method as in claim 1 wherein said gaseous phase is at a temperature at such times as the load bearing surface is contacted therewith which is less than said predetermined temperature range.

17. The method as in claim 1 wherein said gaseous phase is at a temperature at such times as the load bearing surface is being contacted therewith which is greater than said predetermined temperature range.

18. The method as in claim 1 wherein said deposition of said solid reaction product on said load bearing surface is at the rate of from about 250 to about 750 milligrams per hour.

19. The method as in claim 1 wherein said deposited solid reaction product forms a friable film on said load bearing surface.

20. The method as in claim 19 wherein said friable film includes particles of solid reaction product, most of which are less than about 1 micron in size.

21. The method as in claim 1 wherein a minimum temperature value of said predetermined temperature range is above about 475° C.

22. The method as in claim 21 wherein said load bearing surface is formed of a ceramic material.

23. The method as in claim 21 wherein said load bearing surface is frictionally engaged with a second surface, and said deposited solid reaction product reduces friction therebetween.

24. The method as in claim 21 wherein said gaseous phase is at a temperature of less than about 475° C. at such times as the load bearing surface is contacted therewith.

25. The method as in claim 21 wherein said gaseous phase is at a temperature of greater than about 1175° C. at such times as the load bearing surface is being contacted therewith.

26. The method as in claim 21 wherein said component includes carbonaceous species.

27. The method as in claim 26 wherein said solid reaction product consists essentially of carbon soot.

28. A process for providing a solid lubricant on a load bearing surface comprising:
   contacting a load bearing surface with a gaseous phase including at least one component which reacts in a predetermined temperature range to produce a solid reaction product selected from a group consisting of carbon soot, molybdenum disulfide, tungsten disulfide and mixtures thereof, said solid reaction product having friction reducing lubricant properties; and,
   maintaining said load bearing surface within said predetermined temperature range at such times as said load bearing surface is contacted with said gaseous phase so that said solid reaction product deposits directly on said load bearing surface.

29. The method as in claim 28 wherein said solid reaction product consists essentially of carbon soot.

30. The method as in claim 28 wherein said component includes carbonaceous species.

31. The method as in claim 28 wherein said component includes methane.

32. The method as in claim 28 wherein said component includes ethane.

33. The method as in claim 28 wherein said component includes propane.

34. The method as in claim 28 wherein said component includes butane.

35. The method as in claim 28 wherein said component includes carbon dioxide.

36. The method as in claim 28 wherein said component includes carbon monoxide.

37. The method as in claim 28 wherein said component is a plurality of components, said components including carbon dioxide and carbon monoxide.

38. The method as in claim 28 wherein said component is a plurality of components, said components including a molybdenum oxide species and a sulfurous species.

39. The method as in claim 28 wherein said component is a plurality of components, said components including a tungsten oxide species and a sulfurous species.

40. The method as in claim 28 wherein said solid reaction product is molybdenum disulfide.

41. The method as in claim 28 wherein said solid reaction product is tungsten disulfide.

42. The method as in claim 28 wherein said load bearing surface is formed of a ceramic material.

43. The method as in claim 28 wherein said deposited solid reaction product forms a friable film on said load bearing surface, said friable film including particles of said solid reaction product most of which are less than about 1 micron in size.

44. The method as in claim 28 wherein said gaseous phase is at a temperature at such times as the load bearing surface is being contacted therewith which is greater than said predetermined temperature range.

45. The method as in claim 28 wherein said gaseous phase is at a temperature of greater than about 1175° C. at such times as the load bearing surface is being contacted therewith.

46. The method as in claim 28 wherein said deposition of said solid reaction product on said load bearing surface is at the rate of from about 250 to about 750 milligrams per hour.

* * * * *